Figure 1:
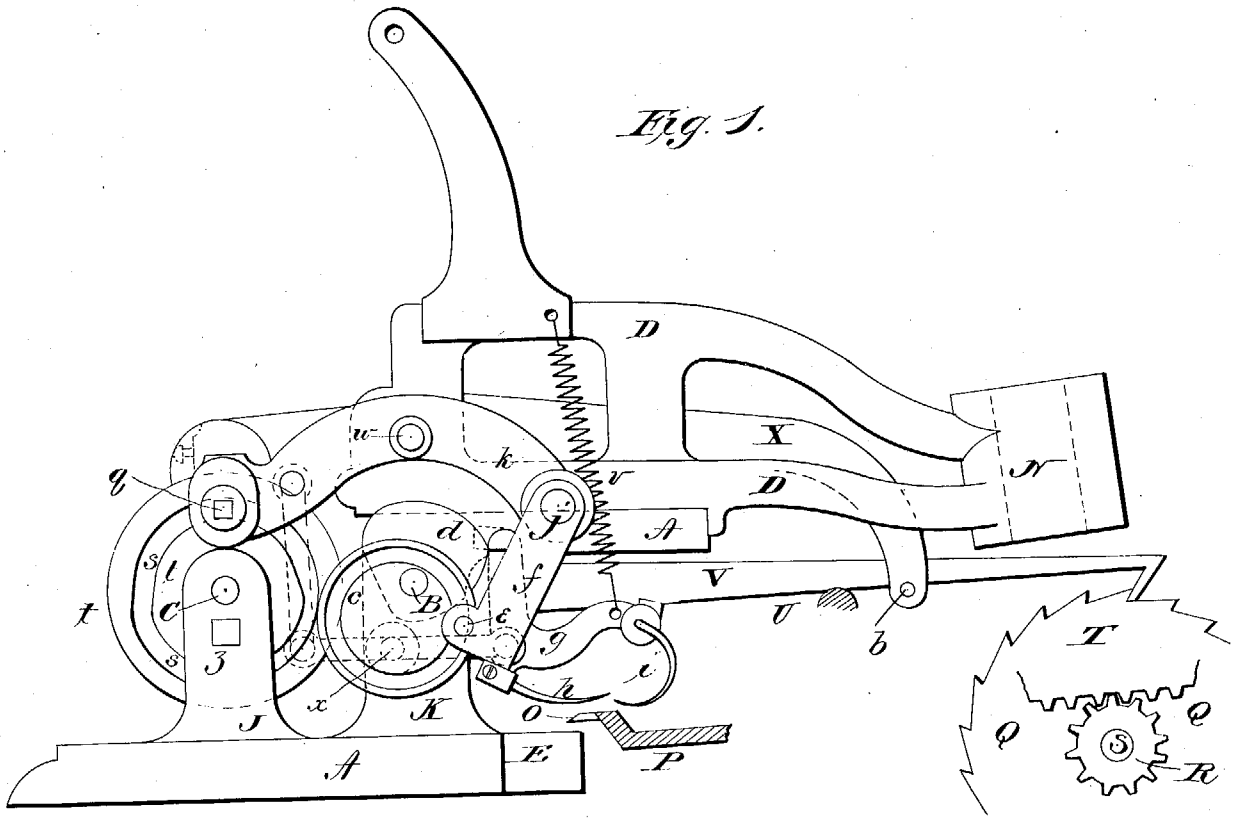

3 Sheets—Sheet 1.

J. CLUTE,

Assignor to CAMPBELL & CLUTE.

MACHINE FOR UNITING KNIT FABRICS.

No. 10,763. Reissued Sept. 21, 1886.

WITNESSES

F. L. Ourand

R. H. Smith.

INVENTOR

John Clute.

by A. M. Smith

Attorney

J. CLUTE,

Assignor to CAMPBELL & CLUTE.

MACHINE FOR UNITING KNIT FABRICS.

No. 10,763. Reissued Sept. 21, 1886.

WITNESSES

F. L. Ourand

Rex Smith.

INVENTOR

John Clute by A. M. Smith

Attorney

J. CLUTE,

Assignor to CAMPBELL & CLUTE.

MACHINE FOR UNITING KNIT FABRICS.

No. 10,763. Reissued Sept. 21, 1886.

WITNESSES

F. L. Durand,

Chas. Smith

INVENTOR

John Clute, by A. M. Smith

Attorney

UNITED STATES PATENT OFFICE.

JOHN CLUTE, OF COHOES, NEW YORK, ASSIGNOR TO CAMPBELL & CLUTE, OF SAME PLACE.

MACHINE FOR UNITING KNIT FABRICS.

SPECIFICATION forming part of Reissued Letters Patent No. 10,763, dated September 21, 1886.

Original No. 344,897, dated July 6, 1886. Application for reissue filed July 27, 1886. Serial No. 209,271.

DIVISION A.

*To all whom it may concern:*

Be it known that I, JOHN CLUTE, of Cohoes, county of Albany, and State of New York, have invented a new and useful Improvement in Machines for Uniting Knit Fabrics, of which the following is a full, clear, and exact description, reference being had to the accompanying drawings, making part of this specification.

My invention relates to certain improvements in that class of turning-off machines described in Letters Patent No. 228,802, dated June 15, 1880, and known as "circular" turning-off machines, used in sewing together the two selvage or looped edges of knitted or looped fabrics, in which machines the "points" carrying the edges of the fabric are arranged in a circle and project radially from a "revolving cylinder," so called, of suitable form and construction, and provided with suitable appliances for carrying the points and bringing and holding them successively under the needle while a single or double stitch is formed. In machines of this class, known as "double-stitch cylinder turning-off machines," a single stitch is made in the usual manner, and the cylinder remains stationary until a second stitch is formed above the other, the two stitches constituting what is called a "double stitch." After a double stitch is thus formed the cylinder moving brings the next point under the needle, when another double stitch is formed and an elastic seam is thus produced. In forming the second stitch—that is to say, the second part of a double stitch—the needle and looper by suitable mechanism are raised above the fabrics high enough to allow the needle to pass over the fabrics at the time when it would otherwise have passed again through the selvage or looped edges, and the second part of the double stitch is completed while the needle and looper are above the fabrics.

My invention consists of a double stitch cylinder turning-off machine in which the needle and the looper are raised and lowered simultaneously by the needle-arm lever and the looper-holder lever, suitably connected with each other and moved by a cam on the counter-shaft.

My invention further consists of certain details of construction hereinafter described, and pointed out in the claims.

Figure 2:
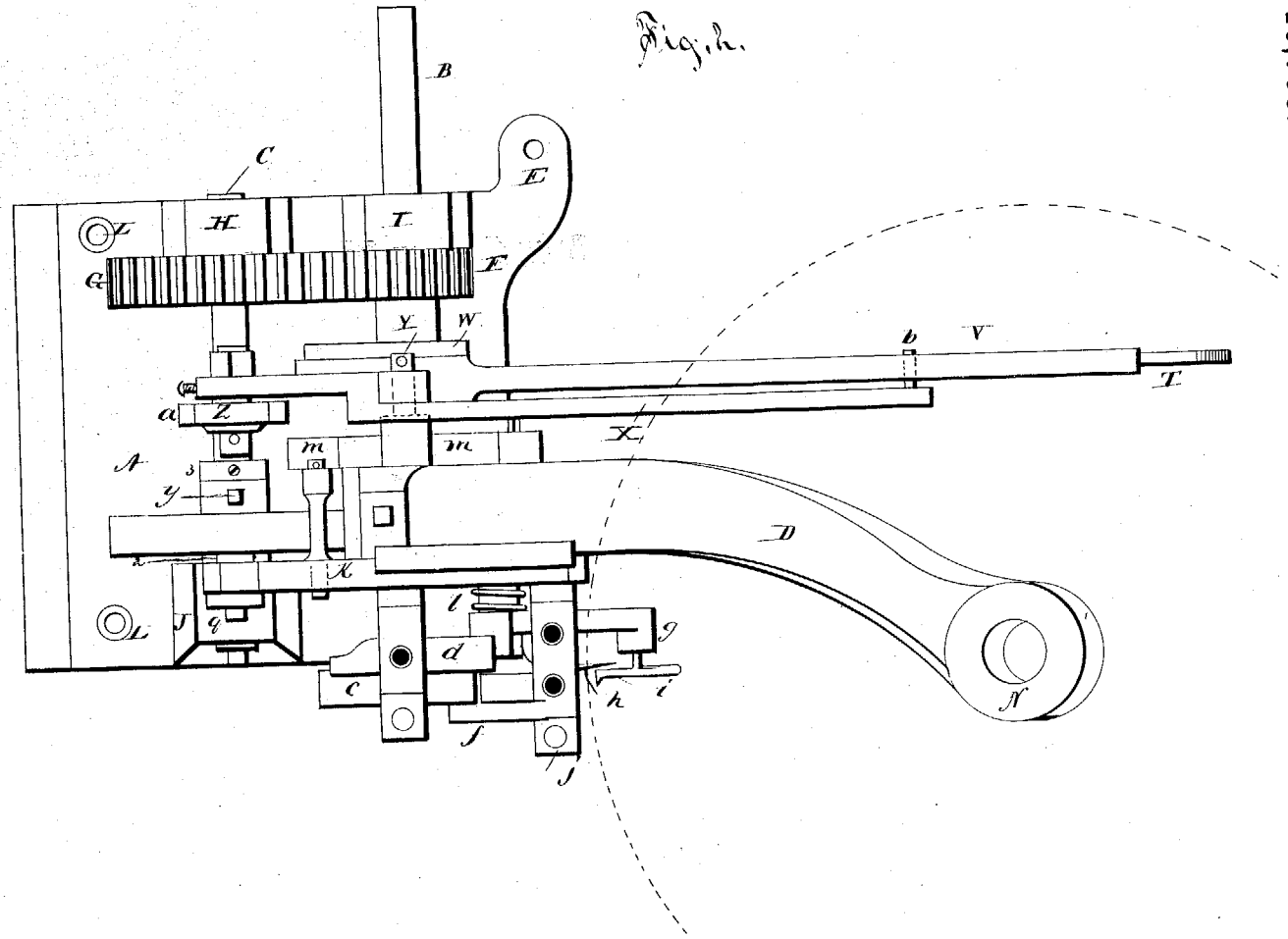
Figure 3:
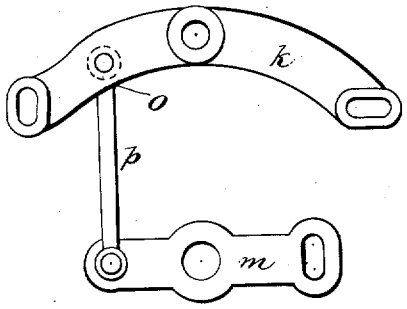
Figure 4:
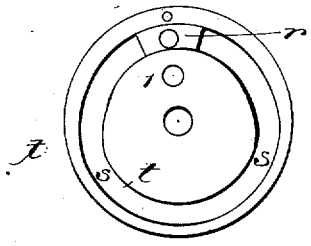
Figure 5:
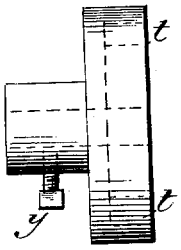
Figure 6:
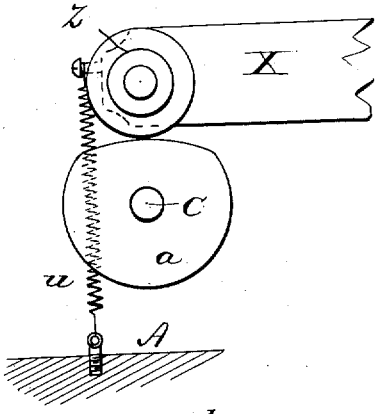
Figure 7:
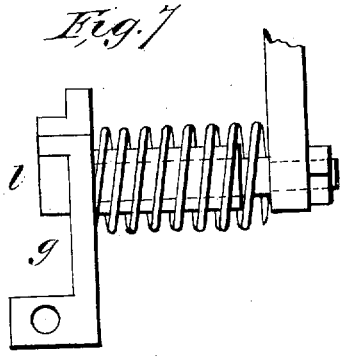
Figure 8:
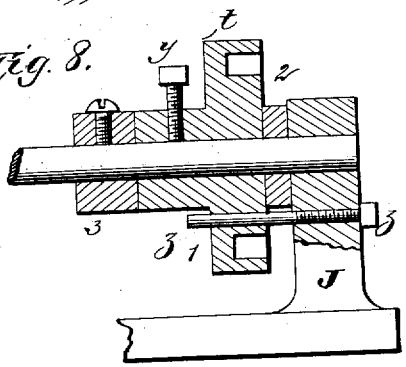

In the accompanying drawings, Figure 1 is a side elevation of my invention with certain details omitted. Fig. 2 is a plan view of the same. Fig. 3 is a side elevation of the needle-arm lever, the looper-holder lever, and the connecting-rod. Figs. 4 and 5 represent the counter-shaft, cam, and cam-block; Fig. 6, the trip-lever cam, roller, and spring, and a part of the trip-lever; Fig. 7, the looper-holder and spring, the end of the looper-holder lever, and the connecting bolt or stud; Fig. 8, the cam-fastening and details.

A is the supporting frame or stand, which may be of any suitable form for carrying the parallel axles B and C, and the projecting arm D.

In the drawings, the axle B is the needle and looper-cam axle, which projects beyond the frame, and in practice carries the driving-pulley and shipping devices.

E is a lug to carry the shipper-lever.

The shipping devices and the driving-pulley are not shown in the drawings.

The axle C is the counter-shaft, is parallel to axle B, and is driven by the spur-wheels F and G at one-half the speed of axle B.

Axles B and C revolve in suitable bearings in uprights H, I, J, and K.

By means of screws through the screw-holes L, the frame or stand A may be secured to the top of a bench or table, near its edge, in such a manner or position that the cylinder will project laterally therefrom.

The outer or overhanging end of arm D is provided with a hub, N, bored to receive the cylinder-axle in the usual manner.

The cylinder is not shown in the drawings, because the construction of such cylinders is too well known to require description here, and the parts of a cylinder necessary to a description of my invention are sufficiently indicated in Figs. 1 and 2.

The cylinder may be of any suitable form and construction for carrying the points O and bringing them successively into their proper positions below the needle.

P is a ring, usually of brass, into which the points O tightly fit. An incomplete section of the ring P and a point, O, are represented in Fig. 1, and the circle of the points is indicated by a dotted line in Fig. 2.

The cylinder is revolved by a circular rack, Q, driven by a pinion, R, on the axle S of the ratchet-wheel T. The number of teeth on the rack is so proportioned to the number of teeth on the pinion and on the ratchet-wheel, that the latter in moving one tooth will move the cylinder enough to carry the points the distance required for each double stitch, or for each single stitch, when the machine is used for making a single-stitch seam.

U is the fulcrum-post usually employed in connection with the eccentric or pawl rod V and eccentric W for working the ratchet-wheel T. The eccentric W is carried by the axle B.

The trip-lever X has its fulcrum in a stud or pin, Y, projecting from the arm D. One end of the trip-lever X is provided with a friction-roller, Z, which rests on the trip-lever cam *a* and receives its motion therefrom. The trip-lever cam in its cylindrical part is concentric with the counter-shaft C, and the other end of lever X is so curved that the bearing-pin *b* does not interfere with the action of the pawl-rod V while the roller Z rests upon the cylindrical port of cam *a*. The cam *a* is flattened on a part of its face, as shown in Fig. 6, in such manner that when the roller Z rests upon the flattened part the pawl V will be lifted, and, resting upon pin *b*, cannot move the ratchet.

When the machine is in operation, forming a double-stitch seam, the parts are so adjusted that the pawl-rod V will be raised in time to prevent the movement of the ratchet while the second part of the double stitch is made.

*c* is the needle-cam, and *d* is the looper-cam. Both are of the usual form, are carried by the axle B, and operate in the usual manner.

A cam-block (not visible in the drawings) moves in the cam-groove of cam *c* and receives the pin *e* of the needle-arm *f*.

*g* is the looper-holder.

*h* is the needle, and *i* the looper.

The stud *j* of the needle-arm is attached to one end of the needle-arm lever *k*. The stud *l* of the looper-holder is attached to one end of the looper-holder lever *m*. The other end of the lever *m* is connected with a stud, *o*, on the lever *k*, by a connecting-rod, *p*. The end of lever *k* nearest the stud *o* is provided with a pin, *q*, inserted in a cam-block, *r*. The cam-block *r* fits loosely in the cam-groove *s* of cam *t* on the counter-shaft C. The cam *t* may have either a groove, *s*, as shown in the drawings, or the end of lever *k* may be provided with a friction-roller and a suitable weight or spring, to hold it down on the face of the cam in a manner similar to that shown in Fig. 6.

The form of cam *t* (clearly shown in the drawings) is such that each revolution of the counter-shaft will once raise and once lower the cam end of the lever *k*, and thereby raise and lower simultaneously the needle and looper when properly connected with or attached to that lever.

The several parts must be so proportioned and adjusted that the needle and looper will be lowered to form a single stitch—that is to say, the first part of a double stitch—and raised to form the second part of a double stitch.

When a single-stitch seam is to be made, the spur-wheel G is moved along the counter-shaft C and thrown out of gear with wheel F, and said counter-shaft and cam *t* thereon fixed in such position that the cam-block *r* will be held at its highest point, thus allowing the needle and looper to remain at their lowest working limit. The cam *a* on said counter-shaft, which is now fixed and inoperative, is also adjusted and fixed in such position and relation to the roller Z on the trip-lever X that said roller and that end of the lever will be elevated and the other end of the trip-lever depressed correspondingly, this allowing the pawl-arm V to always engage and drive the ratchet-wheel T. Thus it will be seen that the axle C, eccentrics *t* and *a*, and the trip-lever X will all be inoperative and at rest, and the pawl-arm V will operate the wheel T at each revolution of the axle B, and thereby cause a single row of stitches to be formed.

*v* is the looper-holder spring, (see Fig. 1,) and *u* is the spring (see Fig. 6) for holding the trip-lever roller Z against the face of the cam. The lever *k* has its fulcrum on a stud, *w*, projecting over the needle-cam, and the lever *m* has its fulcrum on the stud *x*, on the opposite side of the upright column K. The stud *x* is shown in dotted lines in Fig. 1.

When it is desirable to form a double-stitch seam without raising the needle and looper above the fabrics in forming the second part of the double stitch, the set-screw *y* is loosened or taken out, so as to allow the cam *t* to revolve freely on the counter-shaft, and the cam is turned on the shaft until the needle and looper are brought into their lowest positions, and until the fastening-pin *z*, passing through the column J, will enter the hole 1 of the cam and fix said cam to column J so that it cannot rotate. It will thus be seen that since the cam *t* cannot rotate the needle and looper will not be raised, and will always operate in the same plane. The cam *a* will, however, still act upon the trip-lever and cause it to lift the pawl-arm V, for the purpose of allowing the ring to remain stationary until the second stitch is formed.

2 and 3 are suitable collars to prevent the cam *t* from moving endwise on the counter-shaft.

Having thus described my invention, what is claimed in this division of the application is—

1. In a machine for uniting knit fabrics, in which the needle and looper are adapted to be raised and lowered simultaneously, the needle-arm lever *k* and the looper-holder lever *m*, connected with each other, as described, and operated by a cam, *t*, on a counter-shaft C, substantially as described.

2. In a machine for uniting knit fabrics, in which the needle and looper are adapted to be raised and lowered simultaneously, the needle-arm lever *k* and the looper-holder lever *m*, connected with each other by a rod, *p*, and having their fulcrums on opposite sides of the upright K, in combination with a cam, *t*, on a counter-shaft, C, for operating said needle-arm lever and looper-holder lever, substantially as described.

3. In a machine for uniting knit fabrics, in which the needle and looper are adapted to be raised and lowered simultaneously, the needle-arm lever *k* and the looper-holder lever *m*, having a link-connection with each other, in combination with a cam, *t*, for operating the needle-arm lever and looper-holder lever, arranged on a counter-shaft, C, parallel with the needle-cam axle B, and driven by spur-wheels F and G at one-half the speed of that axle, substantially as described.

4. In a machine for uniting knit fabrics, in which the needle and looper are adapted to be raised and lowered simultaneously, the needle-arm lever *k*, the looper-holder lever *m*, connected with each other, as described, a cam, *t*, on the counter-shaft C, for actuating said levers *k* and *m*, and means, substantially as described, for fastening and loosening the cam *t* on the counter-shaft, and for holding the cam stationary while the counter-shaft revolves, substantially as described.

In testimony whereof I have hereunto set my hand this 17th day of July, A. D. 1886.

JOHN CLUTE.

Witnesses:
MURRAY HUBBARD,
DAVID R. SMITH.